Sept. 24, 1940.  W. R. MATHENY  2,215,515
WEATHER STRIP
Filed June 30, 1938
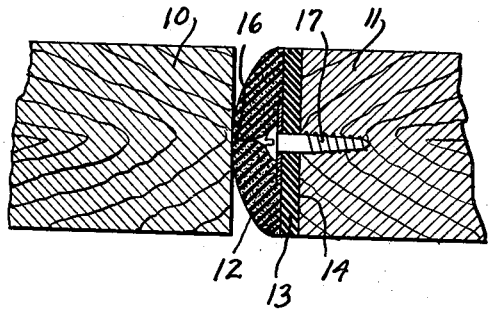
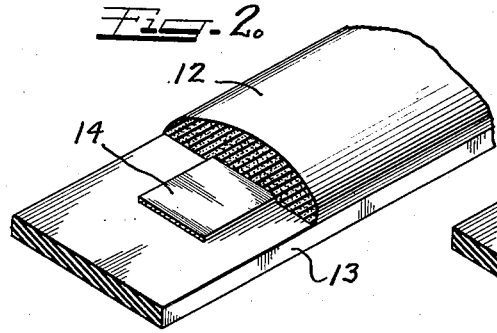
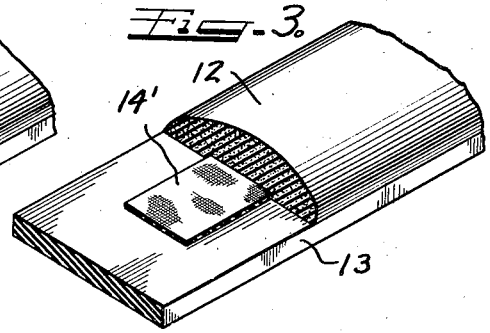
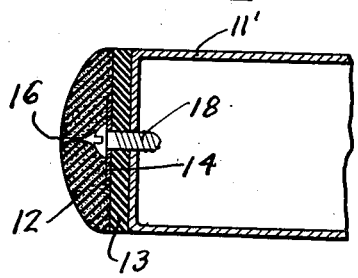
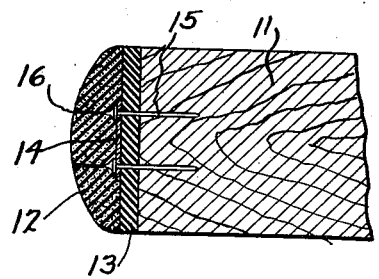
Inventor
WILLARD R. MATHENY.

Patented Sept. 24, 1940

2,215,515

UNITED STATES PATENT OFFICE 2,215,515

WEATHER STRIP

Willard R. Matheny, Chicago, Ill., assignor to Nellie F. Harnly, Chicago, Ill.

Application June 30, 1938, Serial No. 216,641

3 Claims. (Cl. 20—69)

The present invention relates in general to weather strip construction, and is particularly concerned with improvements in weather strips constructed of resilient material such as rubber, whereby the mounting of the strip is facilitated and its maintenance in an operative position assured.

Heretofore it has been proposed to utilize, particularly in connection with sliding doors, a weather strip construction embodying a cushioning layer of resilient material such as sponge rubber having a backing layer of hard rubber. This strip was fastened to the door by driving nails through the sponge rubber and hard rubber layers until the nail head was in abutment with the hard rubber backing.

While the foregoing weather strip and manner of fastening was an excellent arrangement from the standpoint of the ease with which the weather strip could be mounted and secured in place, the arrangement was objectionable in that the hard rubber in time became brittle, so that after being bumped a number of times by trunks or other objects, the nail heads would be pulled through the hard rubber. Thus, the strip not only became detached and inefficient in operation, but was damaged to such extent that it had to be replaced.

Having in mind the inherent disadvantages attending the use of weather strip constructed in the manner just described, the present invention contemplates as its primary object the provision of improved means for preventing the nails, screws or other fastening devices from pulling through the hard rubber.

A further object of the invention is to provide an improved resilient weather strip construction and fastening means therefor which will be concealed when the strip is secured in operative position.

It is a still further object of the present invention to provide a resilient weather stripping having a concealed internal reinforcing strip extending longitudinally throughout its length, and in which the reinforcing strip is utilized in cooperation with the fastening nails, screws or other fastening devices to hold the strip in operative position.

It is also an object to provide a resilient weather strip in which the cushioning and sealing material is bonded to a metallic reinforcing strip.

Other objects and features of the invention will more fully appear from the following detailed description taken in connection with the accompanying drawing, which illustrates several embodiments thereof, and in which Figure 1 is an enlarged fragmentary sectional view illustrating the present invention as being applied to the joint between a pair of relatively movable members;

Figure 2 is a fragmentary isometric view of a preferred form of the invention, parts of the weather strip being progressively cut away to show its construction;

Figure 3 is a similar view of a modified construction of the invention;

Figure 4 is a fragmentary view in section illustrating the manner in which the weather strip may be secured to a metal structure;

Figure 5 is a similar view illustrating one manner in which the weather strip may be secured to a wood structure.

As shown on the drawing:

Although the present invention may be utilized in various ways as a bumper and sealing medium, I have chosen to illustrate the invention as being utilized for sealing the joint between confronting edges of relatively movable members as shown at 10 and 11 in Figure 1. In practice, these members might constitute a door frame and a sliding door mounted therein, the weather strip being used to act as a bumper when the door is closed and seal the joint between the edge of the door and the associated edge of the door frame.

As shown in Figure 2, the preferred form of arrangement comprises a molded or otherwise formed strip of resilient cushioning material 12 such as sponge rubber which is disposed in superposed relation with a backing strip 13 of less resilient material. This backing strip may be of hard rubber.

The strips 12 and 13 form superposed layers of material which are bonded together to form in effect an integral composite structure.

During the formation of the strip, an elongate reinforcing strip 14 is placed at the juncture of the strips 12 and 13, so as to overlie the hard rubber strip and extend longitudinally of the composite structure.

The strip 14 may be constructed of steel or other flexible metal which may be readily bonded to the layers 12 and 13. For this purpose I have used steel as well as brass which is particularly adapted for this purpose since the rubber adheres very well thereto.

The rubber strips are preferably initially molded together with the metal strip therein and then vulcanized to cause bonding of the rubber to the metal strip and an intimate bonding of the rubber strips to each other along each side of the metal strip. On the other hand, the rubber strips may be separately fabricated and laid together with the metal strip in position between them, and any well-known bonding means utilized to secure the parts intimately together. For example, the surfaces which are to be engaged may be coated with a suitable rubber cement.

While the completed strip may have various shapes, it is preferable to provide the hard rubber portion 13 with a flat outer surface so that it may be readily applied against the flat surface upon which it is to be affixed. The surface of the cushioning layer 12 is preferably curved.

The strip 14, in addition to its use in connection with the means for fastening the strip in operative position, also acts to stiffen the weather strip in a lateral direction, but enables easy flexing thereof in a direction normal to the lateral direction.

The modified construction as shown in Figure 3 is similar to the preferred form of construction, except that instead of using a lateral reinforcing strip 14, this strip as shown at 14' may be constructed of suitable fabric material.

As shown in Figures 1, 4 and 5, it will be noted that my improved weather strip is readily adapted to be secured to metal or wood surfaces, and the users may secure the weather strip in operative position by means of nails, screws or other headed fastening devices. Moreover, in the use of these different fastening devices, the user is permitted a relatively large area within which the fastening devices may be distributed in any desired manner, this area being limited only by the size of the reinforcing strip. Thus, the securing devices may be placed as close together as desired or may be staggered throughout the length of the strip.

In Figure 5, the weather strip of the present invention is shown as being secured to the edge surface of a wood structure such as a sliding door by means of nails 15 which are driven through the strip in any desired position, just so the nails pass through the reinforcing strip 14. These nails are driven down until their heads pass into the cushioning layer 12 and abut against the reinforcing strip. It will be noted that, when the heads of the nails are abutting the reinforcing strip, the holes made by the passage of the heads through the cushioning strip will close as shown at 16 thus concealing the nail heads and producing a pleasing appearance. It will also be noted that by securing the weather strip in this manner, all metal parts are disposed below and are spaced from the outer surface of the cushioning strip so that this strip may freely function without interference.

As shown in Figure 1, the weather strip may be secured by wood screws as shown at 17. In this case, however, it will be preferred that a hole or passageway first be drilled through the layers of rubber and the reinforcing strip for receiving the screw therethrough.

Where the weather strip is to be attached to a metal structure, as shown in Figure 4, a hole may be drilled through the layers of resilient material including the reinforcing strip, and also through the metal structure upon which the weather strip is to be mounted. The hole in the reinforcing strip and the hole in the door structure may then be tapped in the usual manner for receiving a machine screw as shown at 18, or a thread cutting steel screw may be applied to the hole so drilled.

With the weather strip mounted in any of the previously described ways, the reinforcing strip prevents the head of the fastening device from being pulled through the hard rubber layer of the weather strip and securely holds the strip in mounted position.

From the foregoing description, it will be apparent that the herein described invention provides an improved weather strip which overcomes the objections and disadvantages inherent in present types of weather strips of this type; in which the fastening means for the weather strip is concealed; in which the fastening means includes an internal reinforcing strip which prevents the nails, screws or other fastening devices from being pulled through the hard rubber backing layer of the weather strip; and provides a resilient weather strip in which the cushioning and sealing material is bonded to a reinforcing strip, which may be of metal, thus producing in effect an integral composite construction.

It is of course to be understood that although I have described in detail a preferred and modified embodiment of my invention, the invention is not to be thus limited, but only in so far as defined by the scope and spirit of the appended claims.

I claim as my invention:

1. A weather strip construction adapted to be mounted with its lateral and top surfaces exposed, said strip comprising a deformable elongate upper layer of sponge rubber, a backing layer of relatively hard rubber material co-extensive with the bottom surface of the upper layer, an interior flat imperforate metal nailing strip extending throughout the length of said layers with one surface engaging the upper surface of the backing layer for distributing the strip retaining forces over relatively large areas of the backing layer, said metal strip being of less width than said layers to provide laterally disposed surface areas of engagement between said layers, and means intimately bonding said lateral surface areas together.

2. A weather strip construction for mounting in an exposed position on a surface, said strip comprising a deformable elongate upper layer of sponge rubber, a backing layer of relatively hard rubber material coextensive with the bottom surface of the upper layer, an interior flat imperforate metal railing strip extending throughout the length of said layers with one surface engaging the upper surface of the backing layer for distributing the strip retaining forces over relatively large areas of the backing layer, said metallic strip being of less width than said layers to provide laterally disposed surface areas of engagement between said layers, and means intimately bonding the layers together at their engaged surfaces and to the metal strip to form a unitary assembly.

3. A smooth surfaced weather strip comprising a backing layer of relatively hard rubber material having planar upper and lower surfaces, a flat imperforate metal strip centrally disposed flatwise of and extending throughout the length of said bottom layer with its lowermost surface in face engagement with the upper surface of the layer, said metal strip having its lateral edges inwardly spaced from the lateral edges of said layer to provide substantial marginal lateral areas on the upper surface of said layer throughout its length, a relatively thicker superposed elongate layer of sponge rubber having a bottom surface conformed to the adjacent surfaces of the backing layer and said strip, and a transversely curved exposed surface with its thickened portion lying directly over the center line of said metal strip, and means intimately bonding the engaged surfaces of the layers and metal strip to form a unitary structure having greatest longitudinal flexibility in a direction at right-angles to the plane of its bottom.

WILLARD R. MATHENY.